United States Patent [19]

Sakamoto et al.

[11] Patent Number: 5,395,878
[45] Date of Patent: Mar. 7, 1995

[54] COLORANT COMPOSITIONS FOR THERMOPLASTIC OLEFIN ELASTOMERS

[75] Inventors: Morihisa Sakamoto, Sakai; Isao Tachihara, Nara, both of Japan

[73] Assignee: Dainichiseika Color & Chemicals Mfg. Co., Ltd., Tokyo, Japan

[21] Appl. No.: 982,883

[22] Filed: Nov. 30, 1992

[30] Foreign Application Priority Data

Dec. 9, 1991 [JP] Japan ................ 3-349395
Dec. 9, 1991 [JP] Japan ................ 3-349396
Dec. 9, 1991 [JP] Japan ................ 3-349397

[51] Int. Cl.$^6$ ............. C08L 83/05; C08K 3/34; C08K 3/36; C08K 5/54
[52] U.S. Cl. ................. 524/506; 524/261; 524/265; 524/442; 524/588
[58] Field of Search ............. 524/265, 442, 492, 493, 524/494, 588, 444, 862, 506, 261; 106/481, 489, 490; 526/279

[56] References Cited

U.S. PATENT DOCUMENTS

| | | | |
|---|---|---|---|
| 3,278,471 | 10/1966 | Rairdon | 524/442 |
| 3,957,717 | 5/1976 | Harada et al. | 524/862 |
| 4,562,107 | 12/1985 | Daniels | 524/444 |
| 4,749,731 | 1/1988 | Kyminas et al. | 524/442 |
| 4,859,723 | 8/1989 | Kyminas et al. | 524/442 |
| 4,937,274 | 6/1990 | Arima et al. | 106/481 |
| 5,109,051 | 4/1992 | Kroenke et al. | 524/444 |
| 5,219,560 | 6/1993 | Suzuki et al. | 526/279 |

FOREIGN PATENT DOCUMENTS

| | | | |
|---|---|---|---|
| 0018634 | 2/1978 | Japan | 106/490 |
| 0016560 | 2/1981 | Japan | 524/442 |
| 0038450 | 2/1985 | Japan | 524/265 |
| 8000708 | 4/1980 | WIPO | 524/265 |

*Primary Examiner*—Peter Szekely
*Attorney, Agent, or Firm*—Oblon, Spivak, McClelland, Maier, & Neustadt

[57] ABSTRACT

Described are colorant compositions for thermoplastic olefin elastomers. They are composed of a pigment; and silicon oxide or a compound containing silicon oxide and/or methylhydrogenpolysiloxane.

4 Claims, No Drawings

COLORANT COMPOSITIONS FOR THERMOPLASTIC OLEFIN ELASTOMERS

BACKGROUND OF THE INVENTION

1) Field of the Invention

This invention relates to colorants for thermoplastic olefin elastomers (hereinafter abbreviated as "TPO"), and more specifically to colorant compositions usable when TPO is colored and formed through a calender roll, mixing roll or embossing roll, or when TPO is similarly processed through a T-die or the like.

2) Description of the Related Art

TPOs have heretofore been formed into a variety of products such as films, sheets or the like while being colored with various organic or inorganic pigments.

Coloration of TPO with a conventional colorant, however, results in the deposition of its pigment on a roll or die surface (this is called "plateout") so that the workability is impaired substantially.

SUMMARY OF THE INVENTION

An object of this invention is therefore to overcome the drawback of the conventional art, thereby to provide a TPO colorant free of plateout.

The above object has been attained by the present invention described hereinafter. The present invention therefore provides a colorant composition for a TPO, comprising: 100 parts by weight of a pigment; and 0.5–100.0 parts by weight of silicon oxide or a compound containing silicon oxide (hereinafter collectively abbreviated as "an $SiO_2$-containing compound") and/or 0.1–20.0 parts by weight of methylhydrogenpolysiloxane Owing to the incorporation of 0.5–100.0 parts by weight of the $SiO_2$-containing compound and/or 0.1–20.0 parts by weight of methylhydrogenpolysiloxane per 100 parts by weight of the pigment, the colorant composition for the TPO does not develop plateout, that is, the phenomenon that the pigment deposits on a roll or die surface.

DETAILED DESCRIPTION OF THE INVENTION AND PREFERRED EMBODIMENTS

The present invention will hereinafter be described more specifically by preferred embodiments.

Examples of the $SiO_2$-containing compound usable in the present invention may include silicic acids such as silicic anhydride, silicic hydrate, ultra-fine silicic anhydride powder and ultra-fine silicic hydrate powder; and silicic-acid-containing compounds such as aluminum silicate, aluminum silicate hydrate, magnesium silicate hydrate and other silicates including calcium silicate and sodium silicate.

Methylhydrogenpolysiloxane usable in the present invention cures under heat and/or by a suitable catalyst, thereby forming hydrophobic coating.

Examples of the pigment, the remaining raw material employed in the colorant composition of the present invention, include organic pigments such as azo pigments, phthalocyanine pigments, nitro or nitroso pigments, basic dyes, acid dyes and mordant dyes; inorganic pigments such as titanium oxide, chrome yellow, chrome vermilion, ultramarine and red oxide; and carbon black.

In addition, examples of substances usable in the present invention as needed include a carrier resin for the provision of a masterbatch such as polyethylene, polypropylene or TPO; a high-molecular substance which can be added to improve the dispersion of the pigment, the workability during production and various physical properties, such as wax, low-molecular-weight polyethylene, polystyrene, a styrene copolymer, a petroleum resin and rosin; a stabilizer for improved stability such as a metallic soap, an organic acid salt or an organometal compound; and various other additives such as a dispersing agent, an antioxidant and an ultraviolet absorber.

The colorant composition of the present invention can take, for example, the following forms:

(1) A wettable colorant composition composed of a pigment and a wax. In this case, the colorant composition preferably comprises 100 parts by weight of the pigment, 0.5–100.0 parts by weight of an $SiO_2$-containing compound, and/or 0.1–20.0 parts by weight of methylhydrogenpolysiloxane, and 20–500 parts by weight of the wax.

(2) A powdery colorant composition composed of a pigment and a metallic soap. In this case, the colorant composition preferably comprises 100 parts by weight of the pigment, 0.5–100.0 parts by weight of an $SiO_2$-containing compound and/or 0.1–20.0 parts by weight of methylhydrogenpolysiloxane, and 20–500 parts by weight of the metallic soap.

(3) A masterbatch composed of a pigment, a dispersing agent and a carrier resin such as a thermoplastic resin, for example, polyethylene, polypropylene or TPO. In this case, the masterbatch preferably comprises 100 parts by weight of a colorant composition and 30–1,000 parts by weight of the carrier resin, said colorant composition being formed of 100 parts by weight of the pigment, 0.5–100.0 parts by weight of an $SiO_2$-containing compound and/or 0.1–20.0 parts by weight of methylhydrogenpolysiloxane, 20–500 parts by weight of the dispersing agent.

Each of these colorant compositions for TPO according to the present invention can be produced by adding an $SiO_2$-containing compound and/or methylhydrogenpolysiloxane as much as desired upon production of a conventionally-known colorant and dispersing the same in a usual manner. Incidentally, when the composition is manufactured, it is preferred to bring the pigment into contact with the $SiO_2$-containing compound and/or methylhydrogenpolysiloxane as much as possible.

The present invention will hereinafter be described specifically by the following examples and comparative examples, in which all designations of "part" or "parts" and "%" mean part or parts by weight and wt. % unless otherwise specifically indicated.

EXAMPLE 1

| | |
|---|---|
| Quinacridone red | 45 parts |
| Silicon oxide ("Solex CM", trade name, product of Tokuyama Soda Co., Ltd.) | 5 parts |
| Polyethylene wax ("Sunwax 151P", trade name, product of Sanyo Chemical Industries, Ltd.) | 50 parts |

The above raw materials were kneaded through a heated three-roll mill, whereby a wettable colorant composition of the present invention was obtained.

COMPARATIVE EXAMPLE 1

| | |
|---|---|
| Quinacridone red | 45 parts |
| Calcium carbonate ("NS-100", trade name; product of Nitto Funka Kogyo K.K.) | 5 parts |
| Polyethylene wax ("Sunwax 151P", trade name; product of Sanyo Chemical Industries, Ltd.) | 50 parts |

The above raw materials were kneaded through a heated three-roll mill, whereby a wettable colorant composition was obtained as a comparative example.

The colorant compositions obtained in the above example and comparative example were each added in an amount of 3 parts to 100 parts of TPO ("Mirastomer 5030", trade name; product of Mitsui Petrochemical Industries, Ltd.), followed by kneading for 4 minutes through a two-roll mill of 180° C. After the removal of the resultant colored sheet, plateout on the roll was cleaned by a cleaning compound (a white PVC compound). The degree of coloration of the cleaning compound was compared.

Results: Degree of coloration of the cleaning compound (compared with the blank)
Example 1
Color difference ($\Delta E$) 0.2 (no substantial change)
Comparative Example 1
Color difference ($\Delta E$) 33.6 (colored in pink)

EXAMPLE 2

| | |
|---|---|
| Titanium white ("R-820 Titanium White", trade name; product of Ishihara Sangyo Kaisha, Ltd.) | 50 parts |
| Silicon oxide ("Silton A", trade name; product of Mizusawa Chemical Co., Ltd.) | 10 parts |
| Polyethylene resin ("Suntec F2270P", trade name; product of Asahi Chemical Industry, Ltd.) | 40 parts |

The raw materials described above were kneaded through an extruder, whereby a masterbatch of the present invention was obtained.

COMPARATIVE EXAMPLE 2

| | |
|---|---|
| Titanium white ("R-820 Titanium White", trade name; product of Ishihara Sangyo Kaisha, Ltd.) | 50 parts |
| Talc ("Talc P", trade name; product of Shiraishi Calcium Co., Ltd.) | 10 parts |
| Polyethylene resin ("Suntec F2270P", trade name; product of Asahi Chemical Industry, Ltd.) | 40 parts |

The raw materials described above were kneaded through an extruder, whereby a masterbatch was obtained as a comparative example.

The masterbatches obtained in the above example and comparative example were each added in an amount of 5.0 parts to 100 parts of TPO ("Mirastomer 6030", trade name; product of Mitsui Petrochemical Industries, Ltd.), followed by kneading for 4 minutes through a two-roll mill of 180° C. After the removal of the resultant colored sheet, plateout on the surface of the roll was observed visually to compare its whiteness.

Results (visual judgment)
Example 2
No white plateout was observed.
Comparative Example 2
Marked white plateout was observed.

EXAMPLE 3

| | |
|---|---|
| Phthalocyanine blue | 50 parts |
| Calcium silicate ("NW-7P", trade name; product of Mizusawa Chemical Co., Ltd.) | 20 parts |
| Calcium stearate | 30 parts |

The raw materials described above were mixed in a high-speed mixer, whereby a colorant composition of the present invention was obtained in the form of powder.

COMPARATIVE EXAMPLE 3

| | |
|---|---|
| Phthalocyanine blue | 50 parts |
| Calcium carbonate ("NS-400", trade name; product of Nitto Funka Kogyo K.K.) | 20 parts |
| Calcium stearate | 30 parts |

The raw materials described above were mixed in a high-speed mixer, whereby a colorant composition as a comparative example was obtained in the form of powder.

The colorant compositions obtained in the above example and comparative example were each added in an amount of 50 parts to 5,000 parts of TPO ("Mirastomer 5030", trade name; product of Mitsui Petrochemical Industries, Ltd.), followed by mixing in the high-speed mixer. The resulting mixture was continuously extruded through a T-die extruder set at 190° C., whereby a film was formed. Plateout on the die was thereafter observed visually to compare the degree of coloration of the die.

Results (visual judgment)
Example 3
The die was practically uncolored.
Comparative Example 3
The die was markedly colored in blue.

EXAMPLE 4

| | |
|---|---|
| Quinacridone red | 45 parts |
| Methylhydrogenpolysiloxane ("Silicone SH1107", trade name; product of Toray Silicone Co., Ltd.) | 4 parts |
| Polyethylene wax ("Sunwax 151P", trade name; product of Sanyo Chemical Industries, Ltd.) | 51 parts |

The raw materials described above were kneaded through a heated three-roll mill, whereby a wettable colorant composition of the present invention was obtained.

COMPARATIVE EXAMPLE 4

| | |
|---|---|
| Quinacridone red | 45 parts |
| Calcium carbonate ("NS-100", trade name; product of Nitto Funka Kogyo K.K.) | 5 parts |
| Polyethylene wax ("Sunwax 151P", | 50 parts |

-continued

| | |
|---|---|
| trade name; product of Sanyo Chemical Industries, Ltd.) | |

The raw materials described above were kneaded through a heated three-roll mill, whereby a wettable colorant composition as a comparative example was obtained.

The colorant compositions obtained in the above example and comparative example were each added in an amount of 3.0 parts to 100 parts of TPO ("Mirastomer 5030", trade name; product of Mitsui Petrochemical Industries, Ltd.), followed by kneading for 4 minutes through a two-roll mill of 180° C. After a colored sheet was removed, plateout on the roll was cleaned by a cleaning compound (a white PVC compound). The degree of coloration of the cleaning compound was compared.

Results: degree of coloration of the cleaning compound (compared with the blank)
Example 4
Color difference (ΔE) 0.1 (no substantial change)
Comparative Example 4
Color difference (ΔE) 33.6 (colored in pink)

EXAMPLE 5

| | |
|---|---|
| Titanium white ("R-820 Titanium White", trade name; product of Ishihara Sangyo Kaisha, Ltd.) | 50 parts |
| Methylhydrogenpolysiloxane ("Silicone SH1107", trade name; product of Toray Silicone Co., Ltd.) | 5 parts |
| Polyethylene resin ("Suntec F2270P", trade name; product of Asahi Chemical Industry, Ltd.) | 45 parts |

The raw materials described above were kneaded through an extruder, whereby a masterbatch of the present invention was obtained.

COMPARATIVE EXAMPLE 5

| | |
|---|---|
| Titanium white ("R-820 Titanium White", trade name; product of Ishihara Sangyo Kaisha, Ltd.) | 50 parts |
| Polyethylene resin ("Suntec F2270P", trade name; product of Asahi Chemical Industry, Ltd.) | 50 parts |

The raw materials described above were kneaded through an extruder, whereby a masterbatch as a comparative example was obtained.

The masterbatches obtained in the above example and comparative example were each added in an amount of 5.0 parts to 100 parts of TPO ("Mirastomer 6030", trade name; product of Mitsui Petrochemical Industries, Ltd.), followed by kneading for 4 minutes through a two-roll mill of 180° C. After the removal of the resultant colored sheet, plateout on the surface of the roll was observed visually to compare its whiteness.

Results (visual judgment)
Example 5
No white plateout was observed.
Comparative Example 5
Marked white plateout was observed.

EXAMPLE 6

| | |
|---|---|
| Phthalocyanine blue | 50 parts |
| Methylhydrogenpolysiloxane "Silicone Oil KF99", trade name; product of Toray Silicone Co., Ltd.) | 3 parts |
| Calcium stearate | 47 parts |

The raw materials described above were mixed in a high-speed mixer, whereby a colorant composition of the present invention was obtained in the form of powder.

COMPARATIVE EXAMPLE 6

| | |
|---|---|
| Phthalocyanine blue | 50 parts |
| Calcium carbonate ("NS-400", trade name; product of Nitto Funka Kogyo K.K.) | 20 parts |
| Calcium stearate | 30 parts |

The raw materials described above were mixed in a high-speed mixer, whereby a colorant composition as a comparative example was obtained in the form of powder.

The colorant compositions obtained in the above example and comparative example were each added in an amount of 50 parts to 5,000 parts of TPO ("Mirastomer 5030", trade name; product of Mitsui Petrochemical Industries, Ltd.), followed by mixing in the high-speed mixer. The resulting mixture was continuously extruded through a T-die extruder set at 190° C., whereby a film was formed. Plateout on the die was thereafter observed visually to compare the degree of coloration of the die.

Results (visual judgment)
Example 6
The die was practically uncolored.
Comparative Example 6
The die was markedly colored in blue.

EXAMPLE 7

| | |
|---|---|
| Quinacridone red | 45 parts |
| Silicon oxide ("Solex CM", trade name; product of Tokuyama Soda Co., Ltd.) | 5 parts |
| Methylhydrogenpolysiloxane ("Silicone SH1107", trade name; product of Toray Silicone Co., Ltd.) | 4 parts |
| Polyethylene wax ("Sunwax 151P", trade name; product of Sanyo Chemical Industries, Ltd.) | 46 parts |

The raw materials described above were kneaded through a heated three-roll mill, whereby a wettable colorant composition of the present invention was obtained.

COMPARATIVE EXAMPLE 7

| | |
|---|---|
| Quinacridone red | 45 parts |
| Calcium carbonate ("NS-100", trade name; product of Nitto Funka Kogyo K.K.) | 5 parts |
| Polyethylene wax ("Sunwax 151P", trade name; product of Sanyo Chemical Industries, Ltd.) | 50 parts |

The raw materials described above were kneaded through a hot three-roll mill, whereby a wettable colorant composition as a comparative example was obtained.

The colorant compositions obtained in the above example and comparative example were each added in an amount of 3.0 parts to 100 parts of TPO ("Mirastomer 5030", trade name; product of Mitsui Petrochemical Industries, Ltd.), followed by kneading for 4 minutes through a two-roll mill of 180° C. After the removal of the resultant colored sheet, plateout on the roll was cleaned by a cleaning compound (a white PVC compound). The degree of coloration of the cleaning compound was compared.

Results: Degree of coloration of the cleaning compound (compared with the blank)
Example 7
Color difference (ΔE) 0.1 (no substantial change)
Comparative Example 7
Color difference (ΔE) 33.6 (colored in pink)

EXAMPLE 8

| | |
|---|---|
| Titanium white ("R-820 Titanium White", trade name; product of Ishihara Sangyo Kaisha, Ltd.) | 50 parts |
| Silicon oxide ("Silton A", trade name; product of Mizusawa Chemical Co., Ltd.) | 10 parts |
| Methylhydrogenpolysiloxane ("Silicone SH1107", trade name; product of Toray Silicone Co., Ltd.) | 5 parts |
| Polyethylene resin ("Suntec F2270P", trade name; product of Asahi Chemical Industry, Ltd.) | 35 parts |

The raw materials described above were kneaded through an extruder, whereby a masterbatch of the present invention was obtained.

COMPARATIVE EXAMPLE 8

| | |
|---|---|
| Titanium white ("R-820 Titanium White", trade name; product of Ishihara Sangyo Kaisha, Ltd.) | 50 parts |
| Talc ("Talc P", trade name; product of Shiraishi Calcium Co., Ltd.) | 10 parts |
| Polyethylene resin ("Suntec F2270P", trade name; product of Asahi Chemical Industry, Ltd.) | 40 parts |

The raw materials described above were kneaded through an extruder, whereby a masterbatch as a comparative example was obtained.

The masterbatches obtained in the above example and comparative example were each added in an amount of 5.0 parts to 100 parts of TPO ("Mirastomer 6030", trade name; product of Mitsui Petrochemical Industries, Ltd.), followed by kneading for 4 minutes through a two-roll mill of 180° C. After the removal of the resultant colored sheet, plateout on the surface of the roll was observed visually to compare its whiteness.

Results (visual judgment)
Example 8
No white plateout was observed.
Comparative Example 8
Marked white plateout was observed.

EXAMPLE 9

| | |
|---|---|
| Phthalocyanine blue | 50 parts |
| Calcium silicate ("NW-7P", trade name; product of Mizusawa Chemical Co., Ltd.) | 20 parts |
| Methylhydrogenpolysiloxane "Silicone Oil KF99", trade name; product of Toray Silicone Co., Ltd.) | 3 parts |
| Calcium stearate | 27 parts |

The raw materials described above were mixed in a high-speed mixer, whereby a colorant composition of the present invention was obtained in the form of powder.

COMPARATIVE EXAMPLE 9

| | |
|---|---|
| Phthalocyanine blue | 50 parts |
| Calcium carbonate ("NS-400", trade name; product of Nitto Funka Kogyo K.K.) | 20 parts |
| Calcium stearate | 30 parts |

The raw materials described above were mixed in a high-speed mixer, whereby a colorant composition as a comparative example was obtained in the form of powder.

The colorant compositions obtained in the above example and comparative example were each added in an amount of 50 parts to 5,000 parts of TPO ("Mirastomer 5030", trade name; product of Mitsui Petrochemical Industries, Ltd.), followed by mixing in the high-speed mixer. The resulting mixture was continuously extruded through a T-die extruder set at 190° C., whereby a film was formed. Plateout on the die was thereafter observed visually to compare the degree of coloration of the die.

Results (visual judgment)
Example 9
The die was practically uncolored.
Comparative Example 9
The die was markedly colored in blue.

We claim:
1. A colorant composition for a thermoplastic olefin elastomer which is kneadable or in the form of a powder, consisting of 100 parts by weight of a pigment, 0.5–100.0 parts by weight of silicon oxide or a compound containing silicon oxide and 0.1–20.0 parts by weight of methylhydrogenpolysiloxane.

2. A wettable colorant composition consisting of a colorant composition consisting of 100 parts by weight of a pigment, 0.5–100.0 parts by weight of silicon oxide or a compound containing silicon oxide and 0.1–20.0 parts by weight of methylhydrogen-polysiloxane, and 20–500 parts by weight of a wax.

3. A powdery colorant composition consisting of a colorant composition consisting of 100 parts by weight of a pigment, 0.5–100.0 parts by weight of silicon oxide or a compound containing silicon oxide and 0.1–20.0 parts by weight of methylhydrogenpolysiloxane, and 20–500 parts by weight of a metallic soap.

4. A masterbatch composition consisting of 100 parts by weight of a colorant composition and 30–1,000 parts by weight of a carrier resin selected from the group consisting of polyethylene, polypropylene and thermoplastic olefin elastomers, said colorant composition consisting of 100 parts by weight of a pigment, 0.5–100.0 parts by weight of silicon oxide or a compound containing silicon oxide and 0.1–20.0 parts by weight of methylhydrogen-polysiloxane, and 20–500 parts by weight of a dispersant, and optionally in the masterbatch composition a stabilizer, an antioxidant or an ultraviolet absorber.

* * * * *